UNITED STATES PATENT OFFICE 2,537,595

MIXED PHTHALATE ESTER COMPOSITIONS

Jacob Levy, Brooklyn, N. Y., and Charles Herbert Lighthipe, Bloomfield, N. J., assignors to Nopco Chemical Company, Harrison, N. J., a corporation of New Jersey No Drawing. Application January 11, 1947, Serial No. 721,668

15 Claims. (Cl. 260—31.4)

The present invention relates to novel mixed phthalate esters and novel plastic compositions containing the new phthalate esters.

Polymerized plastics and elastomers, including synthetic rubbers, usually require the addition of substances known as plasticizers or softeners during their compounding. These plasticizing additives are high boiling solvents for the polymeric substances and are not lost by evaporation from the finished product as would be the case with a volatile solvent. Among the functions of plasticizers are softening the uncured compositions in order to permit the incorporation of various agents therein and the calendering and molding thereof; tackifying the uncured compositions to insure adhesion, cohesion during milling, building operations and molding; and producing flexibility in certain finished compositions. In addition to performing the above functions, a plasticizing agent must possess certain negative qualities. It must neither deteriorate during processing, storage or use nor induce deterioration of other components in the plastic composition. It must not bloom or bleed out of the uncured composition or the finished product, and no appreciable quantity should evaporate out of the finished product during the life thereof. Moreover, plasticizers must not be too expensive, as they form very substantial proportions of most plastic compositions. In view of these many requirements the ideal 'all-purpose plasticizer has not yet been found, and there is a considerable market for novel plasticizers which produce better all-around or superior individual results than the plasticizers of the prior art. This is especially true with respect to the recently developed synthetic polymers, such as polyvinyl resins and the like.

An object of the present invention is to provide novel mixed phthalate esters.

A second object of the present invention is to provide improved plastic compositions.

A third object of the invention is to provide better plasticized resin compositions.

Other objects of the invention will in part be obvious and will in part appear hereinafter.

The novel esters of this invention may be described by the following probable general formula:

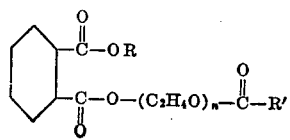

where R represents a saturated or unsaturated alkyl group containing 1 to 12 carbon atoms,

is a fatty acyl radical containing from 8 to 18 carbon atoms and $n$ stands for an integer of from 1 to 10.

The elastomers and other plastic compositions into which the new esters may be incorporated in accordance with this invention cover a wide variety of synthetic materials including acrylic resins, cellulose esters and ethers, synthetic rubbers, vinyl polymers, modified alkyd, and phenol- and urea-aldehyde plastics.

The invention accordingly comprises compositions of matter possessing the characteristics, properties and the relation of components which will be exemplified in the compositions hereinafter described and the scope of the invention will be indicated in the claims.

While many mixed phthalate and di-phthalate esters have been prepared in the past, none have included in a single molecule an alkyl radical replacing one of the carboxylic hydrogens of the dibasic phthalic residue and a higher fatty acid residue linked to the other carboxyl group on the phthalyl ring by a glycol linkage. The structure of these new esters is best shown in the above general formula. The radical denoted by R is not limited to straight chain compounds but includes branched chain groups as well. It will be observed that the other branch of this ester is not a mere ester of an aliphatic alcohol with phthalic acid but consists of acid residues of a higher fatty acid and phthalic acid joined through a glycol linkage. The radical R'CO is limited to higher fatty acyl groups, since it contains a minimum of 8 carbon atoms, and this long chain is believed to enhance the flexibility of an elastomer containing the ester at low temperatures. Any of the ethylene glycols ranging up to decaethylene glycol may be the source of the glycol linkage, triethylene glycol being preferred.

In brief, the preparation of the ester consists of partially esterifying an ethylene or polyethylene glycol with a higher fatty acid and similarly reacting phthalic anhydride with an aliphatic alcohol to produce a mono-alkyl acid phthalate. The fatty acyl-glycol mono ester and mono-alkyl acid phthalate are then esterified to produce the novel mixed ester. As a general rule, it is desirable to employ stoichiometric proportions of all reactants. Commercial or technical grades of the raw materials may be employed in the preparation of the new esters. Moreover, various mixtures can be used in place of a single substance for each of the raw materials; thus the fatty acid may be a mixture of such acids as obtained by splitting the glycerides in a naturally occurring oil.

One branch of the ester can be formed from any aliphatic monohydroxy alcohol containing from 1 to 12 carbon atoms including, inter alia, methanol, ethanol, propanol, butanol, isopropanol, isobutanol, 2-ethyl hexanol, octanol, capryl and lauryl alcohols. The glycol supplying the link in the other branch of the ester may be ethylene glycol, diethylene glycol, triethylene glycol and so forth up to decaethylene glycol. It is desirable that the higher fatty acylating compound be in the form of an acid as exemplified by caprylic, capric, lauric, myristic, palmitic, stearic, oleic, linoleic, and similar fatty acids.

The novel mixed phthalate esters are high boiling liquids, usually of pale amber color. If necessary they may be bleached almost water-white with bleaching clay, decolorizing carbon or other comparable bleaching agents. The ester preferred to all others of the type designated herein because of its compatibility with an especially broad range of substances as well as its excellent properties as a softener or plasticizer for plastics and elastomers is the product of the esterification of butanol, phthalic anhydride, triethylene glycol and the fatty acids derived from coconut oil; the major component of this mixture of mixed esters is triethylene-glycol-monolaurate butyl phthalate.

Compositions which may be plasticized by the esters of the present invention encompass butyl methacrylate and other acrylates; cellulose acetate, cellulose acetate-butyrate, cellulose nitrate and like cellulose esters; ethyl cellulose, benzyl cellulose and similar cellulose ethers; chlorinated rubber, polysulfide rubbers, chloroprene, butadiene-acrylonitrile copolymers known as "Perbunan" and other butadiene rubbers; modified alkyd resins; polystyrene; vinyl resins including the acetate, acetal, butyral, chloride-acetate copolymer and chloride polymers; and phenol-formaldehyde and urea-formaldehyde resins. The expression "polymer of a vinylidene compound" is used herein to connote a polymeric compound prepared by polymerizing a compound containing the $CH_2=C<$ group or by polymerizing a mixture of compounds at least one of which contains the $CH_2=C<$. The expression "polymer of a vinylidene compound" includes, of course, polymers such as acrylate and methacrylate polymers, chloroprene polymers, butadiene-styrene copolymers, butadiene-acrylonitrile copolymers, styrene polymers, polyvinyl acetates, polyvinyl chlorides, polyvinyl acetals, polyvinyl butyrals, copolymers of vinyl chloride and vinyl acetate, and similar polymers or copolymers prepared by the polymerization of compounds containing the $CH_2=C<$ group.

It is apparent that the compounds of this invention possess a striking advantage in the wide range of plastic compositions in which they may be incorporated, for many of the known plasticizers are useful in only one or several small groups of synthetic resins or are specific to a single resin. In addition, the esters disclosed herein are compatible with a broad field of agents employed in plastic compositions as solvents, plasticizers, antioxidants, vulcanization accelerators, modifiers and so forth. It is especially important that the new plasticizing substances are compatible with well known plasticizers, for after one of the new esters has been incorporated in a plastic polymer in a quantity only slightly less than that which will produce bleeding or sweating of the finished product, a different plasticizer may also be added in a substantial quantity prior to curing or molding without causing bleeding in the final article. This is a considerable advantage in compounding products requiring large proportions of plasticizing agents. New plastic and synthetic rubber compositions of this invention containing the novel mixed esters have been found to possess superior low temperature characteristics as evidenced by their unimpaired flexibility. Moreover, they have an excellent sheen on the surface without the greasy feeling which ordinarily denotes "bleeding" of the plasticizer.

No set rule can be predicated for the optimum proportion of the new phthalate ester to be incorporated into a plastic polymer, for this is largely determined by the particular resin chosen and especially the intended use of the product. For example, a freely flexible shower curtain of polyvinyl resin must contain a considerably larger percentage of the plasticizing and softening material than a rigid methacrylate polymer article. The proportions of plasticizers now used in the art will serve as a guide, but practical tests of products prepared from the particular synthetic resin furnish the best means of deciding the exact amount of the novel mixed esters to be employed.

It has been found that for each 100 parts by weight of resin, 100 or more parts of the ester may be blended in the case of ethyl cellulose and aliphatic vinyl compounds and about 40 parts of the plasticizer is usually considered desirable for each 100 parts of vinyl polymer. However, with butyl methacrylate the maximum practical quantity of the ester of this invention runs between 20 and 40 parts and the amount should not greatly exceed 60 parts in compounding a polystyrene resin.

The esters of the present invention are worked into the plastic polymers prior to the curing, molding or extruding of the plastic. Any of the known methods for mixing in plasticizers are suitable; these include directly compounding the resin and plasticizer on a heated mill, stirring the plasticizing liquid into a solution of the resin, and adding an emulsified plasticizer to an emulsified resin. The plasticized compositions have displayed excellent milling characteristics; and the esters "take up" well. No tendency of the plasticizer to sweat or bleed out of properly proportioned mixtures or the final product has been experienced.

For a fuller understanding of the nature and objects of the invention, reference should be had to the following examples which merely illustrate and are not to be construed in a limiting sense; all parts are given in terms of weight.

EXAMPLE I

| | Moles |
|---|---|
| n-Butanol | 1 |
| Phthalic anhydride | 1 |

The alcohol and anhydride were refluxed together in a vessel equipped with a condenser for 60 minutes to form monobutyl phthalate.

| | Parts |
|---|---|
| Coconut fatty acids (mol. wt. about 215) | 39.20 |
| Triethylene glycol | 27.20 |
| Naphtha (VMP grade) | 19.80 |
| Sulfuric acid (98% $H_2SO_4$) | 9.15 |

Into a still fitted with a condenser and a water trap, the ingredients immediately above were charged and refluxed while trapping off all water condensed until the corrected acid value was less than 1.0. The coconut fatty acids had previously been split off from the glycerides in coconut oil by a conventional process. The sulfuric acid was employed as an acid esterification catalyst; and the naphtha as a carrier for the reactants. By utilizing naphtha as a reaction medium, the esterification was performed at a lower temperature thereby minimizing darkening of the product. To the triethylene glycol monolaurate and similar esters in the still were added:

| | Parts |
|---|---|
| Monobutyl phthalate | 40.20 |
| Sulfuric acid (98% H2SO4) | 0.20 |

This mixture was refluxed while trapping off the aqueous condensate until the acid value corrected for sulfuric acid present was less than 10; thereafter the reaction mixture was alkali-refined by treatment with a 10% excess of an aqueous caustic soda solution (10% NaOH) and washed twice with water. At this stage, the acid value was less than 1.0. Most of the naphtha was distilled off under vacuum; then the reaction mass was bleached with 2 parts of concentrated aqueous hydrogen peroxide solution. Upon distilling off the remainder of the naphtha in vacuo, the residue amounted to 100 parts of a product believed to have the formula:

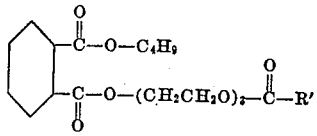

where R'CO represents the mixed fatty acid residues of coconut oil. The product was a pale straw-colored liquid with a boiling point above 200° C. at 10 mm. of mercury pressure.

EXAMPLE II

| | Moles |
|---|---|
| 2-ethyl hexanol | 1 |
| Phthalic anhydride | 1 |
| Coconut fatty acids (mol. wt. about 215) | 1 |
| Triethylene glycol | 1 |

The reactions of Example I were repeated using 2-ethyl hexanol instead of butanol and p-toluene sulfonic acid was substituted as the esterification catalyst. The product was thought to differ only from that of Example I in having the 2-ethyl hexyl radical in the alkyl branch of the mixed ester; it was found to be a pale amber nonvolatile liquid.

EXAMPLE III

| | Moles |
|---|---|
| 2-ethyl hexanol | 1 |
| Phthalic anhydride | 1 |
| Ethylene glycol | 1 |
| Red oil—light colored (commercial oleic acid) | 1 |

Except for omitting the esterification catalyst and naphtha, the reactants were processed in the same manner as in Example I to obtain a pale amber, high boiling liquid product believed to have the formula:

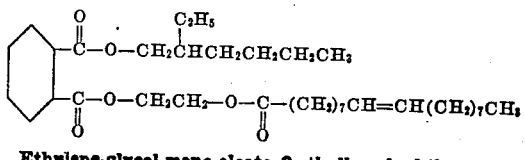

Ethylene-glycol-mono-oleate 2-ethylhexyl phthalate

EXAMPLE IV

| | Moles |
|---|---|
| Methanol | 1 |
| Phthalic anhydride | 1 |
| Nonaethylene glycol | 1 |
| Capric acid | 1 |

These substances were treated in accordance with the procedure of Example I to produce a final product thought to have the structure:

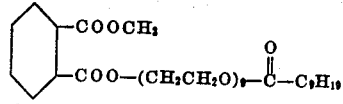

Nonaethylene-glycol-monocaprate methyl phthalate (methyl phthalyl nonaethylene glycol monocaprate)

This liquid was of a pale straw color and possessed a high boiling point.

EXAMPLE V

| | Grams |
|---|---|
| Polyvinyl acetate ("AYAT" grade mfd. by Carbide & Carbon Chem. Corp. 86.5° C. softening point) | 10 |
| Methyl ethyl ketone | 90 |

The resin was dissolved in the ketone solvent and the solution divided into five portions of 20 grams each. One portion was a control sample, and 0.4, 0.8, 1.2 and 2.0 gram quantities respectively of the final ester produced in Example I were added to the other four samples. Each of the five batches was thoroughly stirred, then poured into a 4-inch glass Petri dish. After substantially all of the solvent had evaporated from the plastic mixture while standing at room temperature for a period of at least 8 to 10 hours, all of the dishes were heated for two hours at 105° C. to drive off any remaining solvent. Transparent films remained which appeared to range in thickness from a few thousandths to a few hundredths of an inch. Upon cooling the plastic films were removed from the dishes. The properties observed in the films are set forth in Table A.

EXAMPLE VI

| | Grams |
|---|---|
| Polyvinyl chloride - acetate copolymer ("VYNW" grade mfd. by Carbide & Carbon Chem. Corp. 93–95% vinyl chloride. 24,500 average mol. wt.) | 10 |
| Methyl ethyl ketone | 190 |

The procedure of Example V was duplicated exactly with the above materials. The same amounts of the product of Example I were employed, and the only difference in technique was the use of 40 gram batches of the solution instead of 20 gram portions. The results are tabulated in Table A.

EXAMPLE VII

| | Grams |
|---|---|
| Polyvinyl butyral ("X-I" grade mfd. by Carbide & Carbon Chem. Corp.) | 10 |
| n-Butanol | 190 |

The procedure of Example VI was duplicated exactly with the above ingredients substituted for the corresponding substances in Example VI. The adhesion of all 5 films to glass was so strong that the dishes had to be broken to remove the films, yet none of these films was found to be tacky. The observed characteristics are noted in Table A.

EXAMPLE VIII

| | Grams |
|---|---|
| Polyvinyl chloride | 4 |
| Ethylene dichloride | 76 |

Two samples of equal weight were prepared in accordance with the method of Example V, and the results are listed in Table A. One was a blank sample while the other contained 0.8 gram of the ester product of Example I.

EXAMPLE IX

| | Grams |
|---|---|
| Polystyrene—unmodified ("YA5;K27" grade manufactured by Dow Chem. Co.) | 10 |
| Methyl ethyl ketone | 90 |

Example V was repeated with polystyrene substituted for the polyvinyl resin. See Table A for the properties of the films obtained.

amount of the ester of Example III into the second and a like quantity of the product of Example IV into the third portion. Thereafter the procedure of Example V was duplicated and the results are set forth in Table B below.

EXAMPLE XIII

| | Grams |
|---|---|
| Polyvinyl acetate | 2.0 |
| Methyl ethyl ketone | 18.0 |
| Esther of Example II | 0.8 |

A single film was produced in the manner of Example V utilizing the same resin with a different plasticizer, and the observed properties are contained in Table B.

TABLE A

*Characteristics of plasticized resin films*

[Parts of product of Example I added.]

| Resin 100 Parts | 0 | 20 | 40 | 60 | 100 |
|---|---|---|---|---|---|
| Polyvinyl acetate, Example V | brittle / stiff / nonductile / nontacky / strong | flexible / stiff / ductile / nontacky / strong | flexible / very ductile / nontacky / strong | flexible / very elastic / nontacky / strong | flexible / very elastic / nontacky / strong |
| Polyvinyl chloride-acetate, Example VI | brittle / stiff / nonductile / nontacky / strong | slightly brittle / stiff / slightly ductile / nontacky / strong | flexible / elastic / nontacky / strong | flexible / elastic / nontacky / strong | flexible / limp / very elastic / nontacky / strong |
| Polyvinyl butyral,[1] Example VII | flexible / stiff / nonductile / nontacky / strong | flexible / slightly stiff / nonductile / nontacky / strong | flexible / nonductile / nontacky / strong | flexible / slightly elastic / nontacky / strong | flexible / elastic / nontacky / strong |
| Polyvinyl chloride, Example VIII | flexible / stiff / nonductile / nontacky / weak | | flexible / ductile / tacky | | |
| Polystyrene, Example IX | very brittle / stiff / nonductile / nontacky / strong | brittle / stiff / nonductile / nontacky / strong | flexible / ductile / nontacky / strong | very flexible / limp / ductile / slightly tacky | very flexible / limp / very ductile / very tacky / very weak.[2] |
| Ethyl cellulose, Example X | very brittle / very stiff / nonductile / nontacky / strong | brittle / stiff / nonductile / nontacky / strong | flexible / slightly stiff / nonductile / nontacky / strong | flexible / nonductile / nontacky / strong | flexible / nonductile / nontacky / strong |
| Butyl methacrylate, Example XI | brittle / stiff / nonductile / nontacky / strong | flexible / elastic / slightly tacky / strong | limp / ductile / very tacky / very weak.[2] | limp / ductile / very tacky / very weak.[2] | limp / ductile / very tacky / very weak.[2] |

[1] All films adhered so strongly to glass that Petrie dishes had to be broken to remove films.
[2] Films tore while being removed from Petrie dishes. Overplasticized.

EXAMPLE X

| | Grams |
|---|---|
| Ethyl cellulose—22 centipoises viscosity ("N22" grade mfd. by Hercules Powder Co.) | 10 |
| Methyl ethyl ketone | 90 |

The procedure of Example V was duplicated with the above substances, and characteristics of the resulting films are tabulated in Table A.

EXAMPLE XI

| | Grams |
|---|---|
| Butyl methacrylate polymer | 10 |
| Methyl ethyl ketone | 90 |

Plastic films were produced from the acrylic polymer in the same manner as in Example V, and their properties are listed in Table A. It was observed that the plastics containing 40 to 100 parts of the product of Example I based on 100 parts of the resin were overplasticized for most purposes.

EXAMPLE XII

| | Grams |
|---|---|
| Polyvinyl chloride-acetate copolymer | 6 |
| Methyl ethyl ketone | 84 |

This resin was the same as that of Example VI. After dividing the resin solution into three thirty-gram portions, 0.8 gram of the product of Example II was stirred into the first batch, a similar

TABLE B

| Resin 100 Parts | Plasticizer | Characteristics of Plasticized Resin Films |
|---|---|---|
| Polyvinyl chloride-acetate, Example VI. | None | brittle. / stiff. / nonductile. / nontacky. / strong. |
| Polyvinyl chloride-acetate, Example XII. | 40 parts ester of Example II. | flexible. / stiff. / ductile. / nontacky. / strong. |
| Polyvinyl chloride-acetate, Example XII. | 40 parts ester of Example III. | flexible. / stiff. / nonductile. / nontacky. / strong. |
| Polyvinyl chloride-acetate, Example XII. | 40 parts ester of Example IV. | flexible. / stiff. / slightly elastic. / nontacky. / strong. |
| Polyvinyl acetate, Example V. | None | brittle. / stiff. / nonductile. / nontacky. / strong. |
| Polyvinyl acetate, Example XIII. | 40 parts ester of Example IV. | flexible. / limp. / very ductile. / nontacky. / strong. |

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which, as a matter of language, might be said to fall therebetween; and that they are intended to be inclusive in scope and not exclusive, in that if desired, other materials may be added to my novel compositions of matter herein claimed without departing from the spirit of the invention. Particularly it is to be understood that in said claims, ingredients or components recited in the singular are intended to include compatible mixtures of said ingredients wherever the sense permits.

Having described our invention, what we claim as new and desire to secure by Letters Patent is:

1. A novel composition of matter which comprises a blend of a polymer of a vinylidene compound, said polymer being selected from the class consisting of plastic and elastic polymers of vinylidene compounds, and as a plasticizer for the polymer a compound having the general formula:

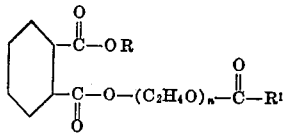

where R is an alkyl group containing from 1 to 12 carbon atoms,

is a fatty acyl radical containing from 8 to 18 carbon atoms and n stands for an integer from 1 to 10.

2. The composition of claim 1 in which R represents a normal butyl radical,

stands for mixed acyl radicals derived from coconut oil and n is 3.

3. A novel composition of matter which comprises a blend of a polymer of a vinylidene compound, said polymer being selected from the class consisting of plastic and elastic polymers of vinylidene compounds, and as a plasticizer for the polymer triethylene-glycol-monolaurate butyl phthalate.

4. A novel composition of matter which comprises a blend of a polyvinyl butyral selected from the class consisting of plastic and elastic polyvinyl butyrals and as a plasticizer therefor a compound having the general formula:

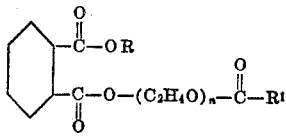

where R is an alkyl group containing from 1 to 12 carbon atoms.

is a fatty acyl radical containing from 8 to 18 carbon atoms and n stands for an integer from 1 to 10.

5. The composition of claim 4 in which R represents a normal butyl radical,

stands for mixed acyl radicals derived from coconut oil and n is 3.

6. A novel composition of matter which comprises a blend of a polyvinyl butyral selected from the class consisting of plastic and elastic polyvinyl butyrals and as a plasticizer therefor triethylene-glycol-monolaurate butyl phthalate.

7. A novel composition of matter which comprises a blend of a styrene polymer selected from the class consisting of plastic and elastic styrene polymers and as a plasticizer therefor a compound having the general formula:

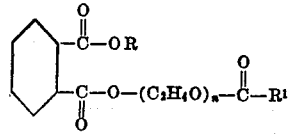

where R is an alkyl group containing from 1 to 12 carbon atoms,

is a fatty acyl radical containing from 8 to 18 carbon atoms and n stands for an integer from 1 to 10.

8. The composition of claim 7 in which R represents a normal butyl radical,

stands for mixed acyl radicals derived from coconut oil and n is 3.

9. A novel composition of matter which comprises a blend of a styrene polymer selected from the class consisting of plastic and elastic styrene polymers and as a plasticizer therefor triethylene-glycol-monolaurate butyl phthalate.

10. A novel composition of matter which comprises a blend of a vinyl chloride vinyl acetate copolymer selected from the class consisting of plastic and elastic vinyl chloride-vinyl acetate copolymers and as a plasticizer therefor a compound having the general formula:

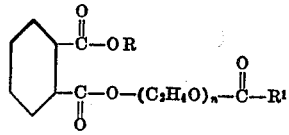

where R is an alkyl group containing from 1 to 12 carbon atoms,

is a fatty acyl radical containing from 8 to 18 carbon atoms and n stands for an integer from 1 to 10.

11. The composition of claim 10 in which R represents a normal butyl radical,

stands for mixed acyl radicals derived from coconut oil and n is 3.

12. A novel composition of matter which comprises a blend of a vinyl chloride-vinyl acetate copolymer selected from the class consisting of plastic and elastic vinyl chloride-vinyl acetate copolymers and as a plasticizer therefor triethylene-glycol-monolaurate butyl phthalate.

13. A novel composition of matter which comprises a blend of a butadiene-acrylonitrile copolymer selected from the class consisting of plastic and elastic butadiene-acrylonitrile copolymers and as a plasticizer therefor a compound having the general formula:

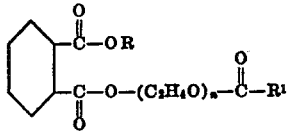

where R is an alkyl group containing from 1 to 12 carbon atoms,

is a fatty acyl radical containing from 8 to 18 carbon atoms and $n$ stands for an integer from 1 to 10.

14. The composition of claim 13 in which R represents a normal butyl radical,

stands for mixed acyl radicals derived from coconut oil and $n$ is 3.

15. A novel composition of matter which comprises a blend of a butadiene-acrylonitrile copolymer selected from the class consisting of plastic and elastic butadiene-acrylonitrile copolymers and as a plasticizer therefor triethylene-glycol-monolaurate butyl phthalate.

JACOB LEVY.
CHARLES HERBERT LIGHTHIPE.

REFERENCES CITED

The following references are of record in the file of this patent:

UNITED STATES PATENTS

| Number | Name | Date |
|---|---|---|
| 1,786,404 | Young | Dec. 23, 1930 |
| 2,115,709 | Dreyfus | May 3, 1938 |
| 2,343,434 | Wells et al. | Mar. 7, 1944 |
| 2,462,354 | Brubaker | Feb. 22, 1949 |
| 2,473,548 | Smith | June 21, 1949 |
| 2,475,016 | DeNie | July 5, 1949 |

OTHER REFERENCES

Chemical Abstracts, vol. 39, 1945, page 5966.
Morrell: Synthetic Resins and Allied Plastics (1943), pp. 188 and 189.
Simonds et al.: Handbook of Plastics, 2d ed., 1949, pp. 1042–1047.